(12) United States Patent
Adkisson et al.

(10) Patent No.: US 7,774,652 B2
(45) Date of Patent: Aug. 10, 2010

(54) CIRCUITRY AND METHOD TO DETECT CONDITIONS OF DATA (75) Inventors: Richard Adkisson, Plano, TX (US); Michael Schroeder, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 11/523,472

(22) Filed: Sep. 19, 2006

(65) Prior Publication Data
US 2008/0072110 A1 Mar. 20, 2008

(51) Int. Cl.
*G01R 31/3177* (2006.01)
(52) U.S. Cl. .......................................... 714/37; 714/812
(58) Field of Classification Search ............... 714/37, 714/812
See application file for complete search history.

(56) References Cited

U.S. PATENT DOCUMENTS

| | | | |
|---|---|---|---|
| 4,972,138 A * | 11/1990 | Bush ........................ 324/73.1 |
| 5,737,520 A | 4/1998 | Gronlund et al. |
| 5,880,671 A | 3/1999 | Ranson et al. |
| 5,887,003 A | 3/1999 | Ranson et al. |
| 5,956,476 A | 9/1999 | Ranson et al. |
| 6,389,558 B1 | 5/2002 | Herrmann et al. |
| 6,499,123 B1 | 12/2002 | McFarland et al. |
| 6,615,368 B1 | 9/2003 | Dunlap |
| 6,615,369 B1 * | 9/2003 | Beck et al. ................ 714/39 |
| 6,662,313 B1 | 12/2003 | Swanson et al. |
| 6,681,353 B1 | 1/2004 | Barrow |
| 6,704,889 B2 | 3/2004 | Veenstra et al. |
| 6,754,852 B2 | 6/2004 | Swoboda |
| 6,789,217 B2 * | 9/2004 | Slaugh et al. ............. 714/39 |
| 6,834,360 B2 | 12/2004 | Corti et al. |
| 7,065,481 B2 | 6/2006 | Schubert et al. |
| 7,191,079 B2 * | 3/2007 | Smith et al. ............... 702/67 |
| 2003/0212937 A1 | 11/2003 | Todd et al. |

* cited by examiner

*Primary Examiner*—Stephen M Baker (57) ABSTRACT

A system may comprise a condition detection system that includes change circuitry configured to detect a change for at least one predetermined bit of an N-bit bus, where N is a positive integer, and to provide a corresponding change signal indicative of the detected condition. Match circuitry is configured to detect a match condition for up to a selected subset of predetermined bits of the N-bit bus and to provide a corresponding match signal indicative of the detected condition. Selection circuitry is programmable to provide a selected one of the change signal and the match signal as a corresponding output signal.

20 Claims, 3 Drawing Sheets

CIRCUITRY AND METHOD TO DETECT CONDITIONS OF DATA

BACKGROUND

As higher levels of circuit integration are achieved on a single integrated circuit chip or a chipset, there tends to be an increased complexity associated with monitoring and analyzing internal operation of a chip or associated with internal operation of the chipset. One device that can assist some aspects of monitoring and analyzing operation is a logic analyzer. A logic analyzer can take any of several forms, ranging from a simple PC plug-in card to a sophisticated bench-top mainframe that accepts a variety of high-performance plug-in functions.

DETAILED DESCRIPTION

Figure 1:
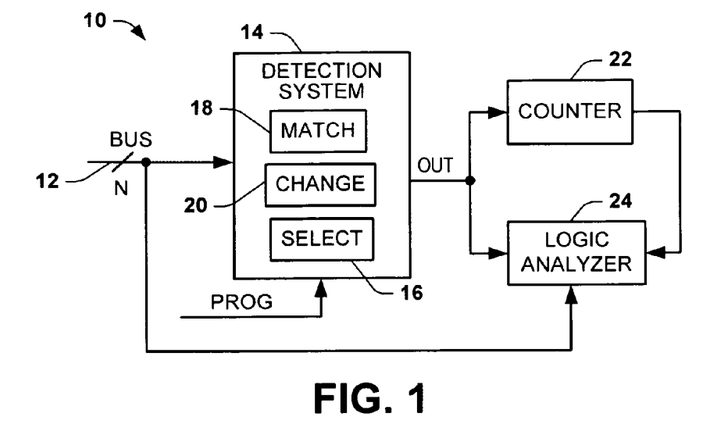
FIG. 1 depicts one embodiment of a system to detect a condition of data.

FIG. 1 depicts an example of a system 10 for detecting one or more conditions of data that propagates on an N-bit bus 12, where N is a positive integer. As used herein, the terms "data" and "signal" or "signals" are used interchangeably to identify one or more bits of information that can be communicated from one component to another component as well as bi-directionally between components.

The system 10 includes a detection system 14 programmed and/or configured to determine whether one or more pre-defined conditions have been met based on the data propagated on the bus 12. The detection system 14 provides an output (OUT) signal that indicates whether the one or more predefined conditions have been met.

The detection system 14 can include an arrangement of logic circuitry configured to analyze or evaluate the data, such as by performing one or more operations or functions on one or more selected bits of the N-bit bus (e.g., a bit pattern). The operation(s) performed by the detection system 14 can be programmed based on a program (PROG) signal. The PROG signal can include one or more data fields, each field having one or more bits. For instance, one field can be employed to establish an operating mode that controls which condition is to be detected for the data received via the bus 12. The detection system 14 includes a select block 16 that is configured to select one of at least two available operations, the results of which are provided as the OUT signal. In the example of FIG. 1, the detection system 14 also includes a match logic block 18 and a change logic block 20. Each of the logic blocks 18 and 20 can be implemented as circuitry configured to perform corresponding operations on one or more bits of the signal on the bus 12.

The select block can select block can be programmable based on the PROG signal, such as to select which of the match logic and change logic blocks 18 and 20 provides the OUT signal. The select block 16 can be implemented, for example, as a switching system or multiplexer that couples the output of one or more of the blocks 18 and 20 to provide the OUT signal.

The change block 20 is configured to detect a change in at least one predetermined bit of the data on the bus 12. The change block can provide a corresponding change signal indicative thereof the detected condition. The change block 20 can be programmable based on change mask data in the PROG signal. For instance, one or more bits of the PROG signal can to program the change block to select which one or more bits (e.g., up to N bits that define a bit pattern) of bus 12 are to be analyzed to determine whether a change condition has occurred.

To enable the change detect operation, the detection system 14 can include a data storage unit (not shown) that can store N-bits of data from the bus 12. The stored data thus corresponds to a previous state of the N-bits of data (e.g., a snap shot of the N-bit bus 14), whereas the bus itself include a present state of the data. The change block 20 thus can detect a change in one or more bits of data by performing appropriate bitwise operations on the stored data and the present data on the bus 12 for a specified bit pattern. The results of the logic operation can be stored as data (e.g., one or more bits) in another data storage device (not shown) to provide a corresponding signal indicative of a change in the data bus. Those skilled in the art will appreciate that the change block 20 can be utilized to selectively monitor and determine if one or more pre-selected bits of data on the bus have changed.

The match block 18 is configured to detect a match condition in up to a selected subset of the N-bits on the bus 12 (e.g., a bit pattern). For example, the match operation can be performed on a selected subset of up to about N/2 bits of the available N bits. The selected subset of bits can be programmed by the PROG signal. The PROG signal can also include match mask data field that programs the match condition that is performed by the match block 18 on the selected subset of bits. The selected subset of bits can include contiguous bits on the bus 12 or the bits can be distributed throughout the bus, as established by the PROG signal. The match block 18 provides a corresponding match signal indicative of whether a match condition was detected for the selected subset of bits (or bit pattern).

To achieve additional efficiency (e.g., reduce number of control bits), the match mask data field and the change mask data field can correspond to the same field (and at least a substantial number of the same bits) of the PROG signal. Thus, by setting the mode data, the select block 16 can provide the relevant output signal from a selected one of the match block 18 and the change block 20 as the OUT signal.

In the example of embodiment FIG. 1, the detection system 14 provides the OUT signal to a counter 22 and to a logic analyzer 24. The counter 22 can be configured to increment a count value based on the corresponding OUT signal. The counter further can be controlled to track the OUT signal during a time period corresponding to a predetermined or detected event. The logic analyzer 24 can be configured to perform additional logic analysis and to capture data that propagates on the bus 12. For instance, the OUT signal can be provided to the logic analyzer 24 to qualify storage of data from the bus 12. Additionally or alternatively, the OUT signal can be employed to trigger further logic analysis of data on the bus 12.

While the example of FIG. 1 depicts match and change blocks 18 and 20, those skilled in the art will understand and appreciate that the detection system 14 can include one or more other monitoring or analysis blocks. As an example, the detection system 14 can include circuitry configured to arithmetic operations, thresholding, additional matching operations, Booleans logic operations, as well as combinations of these and other functions relative to one or more bits the data on the bus 12. When such additional blocks are implemented in the detection system 14, the select block 16 can be programmable to provide the corresponding OUT signal by selecting a respective output of one of the internal logic blocks based on the mode defined by the PROG signal.

By way of example, the system 10, including the detection system 14, can be implemented as hardware, such as one or more integrated circuits within a computer system. The bus 12, for example, receives data from one or more sources in an integrated circuit chip or from anywhere in an associated device (e.g., a computer system) in which the system 10 is implemented. The bus 12, for example, can operate as a synchronous bus structure configured to propagate multi-bit data from one or more predetermined locations to provide the N-bits of data. Additionally or alternatively, the bus 12 can receive data from other integrated circuits that may be communicatively coupled with the bus 12, such as within a computer system, as well as from a combination of locations within the same integrated circuit. For example, the bus 12 can be implemented as an 80-bit signal.

Those skilled in the art will understand and appreciate various approaches and feed structures that can be utilized to drive the bus 12 with data. One example of a feed structure (e.g., interface) that can be employed to provide data to the bus 12 include bus interface modules. These and other feed structures can obtain data from within a computer system, such as from other bus structures (e.g., processor bus, PCI bus, etc.) or memory, and provide the data to the bus 12. In a multi-processor, multi-cell computer system, for example, the bus 12 can also include data from other cell boards, such as can be provided through a crossbar structure communicatively coupled with the bus 12. In such larger systems, a plurality of the systems 10 can be distributed throughout the system, including one or more of such systems on a single integrated circuit. The bus 12 thus may be referred to herein as an observability bus or a debug bus, depending on the context of the system 10.

As another example, the system 10 can be implemented as part of an external logic analyzer that includes one or more input ports (e.g., N. parts) that can couple to a circuit board or to pins of an IC. The system 10 thus can receive the N-bits of data via the one or more input ports. The N-bits of data, for example, may represent data propagating on the observability bus or debug bus of associated circuitry to which the external logic analyzer is coupled.

Figure 2:
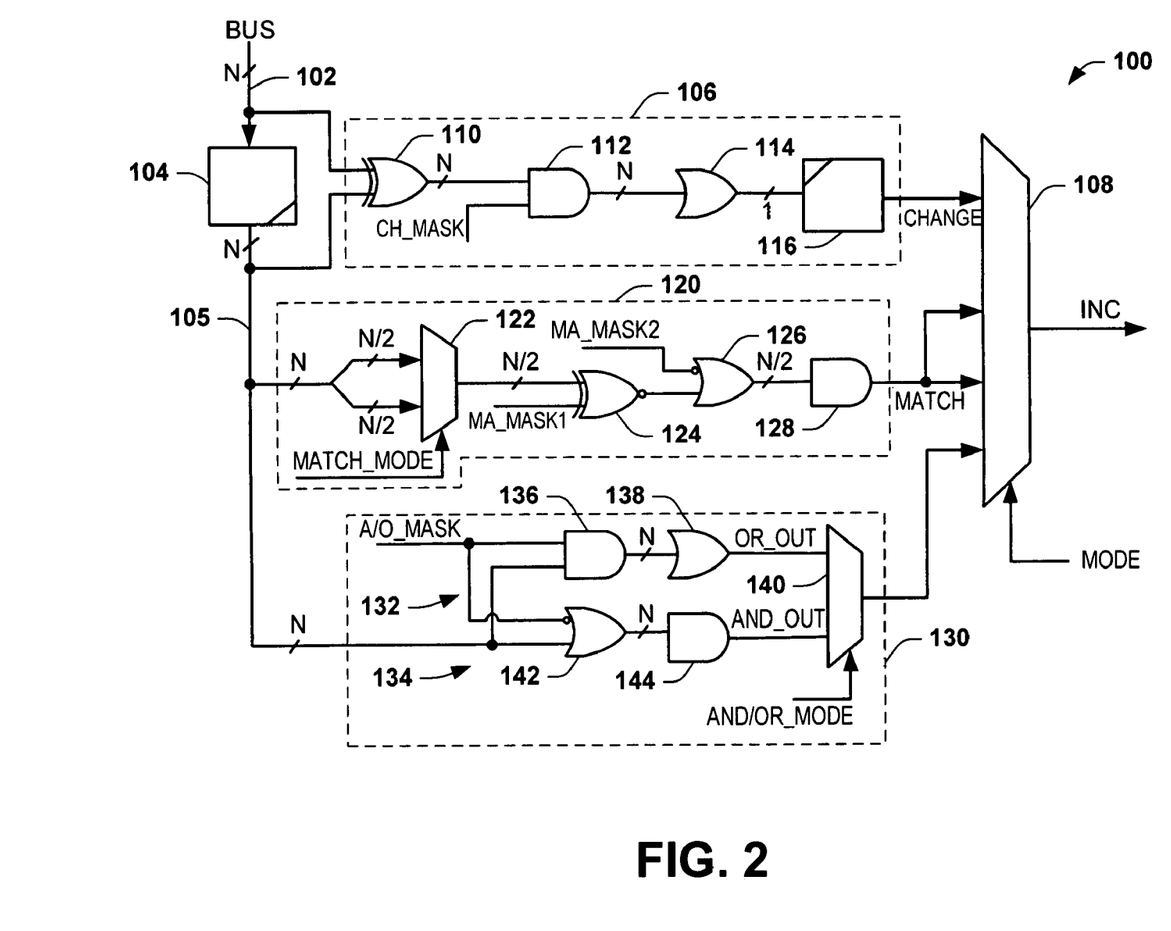
FIG. 2 depicts another embodiment of a system that can detect a condition of data.

FIG. 2 depicts one exemplary embodiment of a detection system 100. The system 100 is coupled to receive N bits of data such as corresponding to data propagating on an N-bit bus 102. The bus 102 can correspond to an observability or debug bus or to input port for receiving such data, such as mentioned above. An N-bit storage device 104 stores an instance of the N-bits and provides a corresponding output at 105 corresponding to a previous version of the N-bits. The output 105 of the storage device 104 thus provides snapshot of the bus 102 to establish timing from that point forward. The detection system 100 is programmed and configured to determine one or more conditions associated with data on the bus 102.

In the example of FIG. 2, the detection system 100 includes change circuitry 106 that is operative to detect a change in a selected portion (e.g., a specific bit pattern) of the data bus 102. The change circuitry 106 provides a corresponding CHANGE logic output signal to an input of selection circuitry 108. The CHANGE signal indicates whether a selected section of up to N bits of the bus has changed based on the data on the bus 102 and the snapshot of the bus at 105.

The selection circuitry 108 can select one of a plurality of inputs (including the CHANGE signal) according to a MODE signal. In the example of FIG. 2, the MODE signal can be a two-bit selection signal sufficient to select one of four possible inputs. It will be understood and appreciated that the selection circuitry can be configured to select any number of two or more inputs based on a corresponding MODE signal. The MODE signal can be provided by an associated memory, such as a control and status register (CSR) or other type of addressable memory.

As an example, the change circuitry 106 can include an exclusive-OR (XOR) circuit (represented in FIG. 2 as a single XOR gate) 110. The XOR circuit 110 performs a bitwise exclusive-OR operation on the previous and current N-bits of the bus 102. The XOR gate 110 provides a corresponding N-bit output to an AND circuit (represented in FIG. 2 as a single AND gate) 112. The AND circuit 112 performs a bit-wise AND function on the N-bit output from the XOR circuit 110 and a change mask (CH_MASK) input. The CH_MASK input can be an associated N-bit signal provided from associated memory pre-programmed to provide a mask function that enables the change circuitry to detect a change a selected set of one or more (up to N) bits (e.g., a specified bit pattern). For instance, the CH_MASK input can select any combination of one or more of the N bits to mask out (or in) any of the N bits for which it may be desired to detect a change.

The AND circuit 112 provides a corresponding N-bit output to an OR circuit (represented as a single OR-gate) 114. The OR circuit 114 ORs together each of the bits in the N-bit output from the AND circuit 112. The OR circuit 114 provides a logic output (e.g., a single bit—although it could be more than one bit) that indicates if the specified bit pattern (e.g., selected based on the CH_MASK input) has changed. The output of the OR circuit 114 can be stored in a data storage device 116. The storage device 116, for example, can be implemented as a latch (e.g., a flip flop) or other type of circuitry capable of storing the output from the OR circuit 114. The storage device provides the stored logic signal to an input of the selection circuitry 108. Those skilled in the art will appreciate other arrangements of circuit components that can be utilized to detect a change in the signals on the bus 102.

The detection system 100 can also include match circuit 120. The match circuit 120 can be configured to perform matching of a one or more selected portions (e.g., a specified bit pattern) of the N-bit data provided at the output of the storage device 104. The matching can include matching a logic 1, logic 0, or "don't care" ("X") on any bit in a given block of one or more data bits. Those skilled in the art will understand and appreciate various types of matching that can be implemented in the match circuitry 120.

In the illustrated embodiment, the match circuitry 120 can be utilized to detect a match in any part of corresponding N/2 bit blocks of the available N bits from the bus 102. The N-bit output from the storage device 104 can be split into two corresponding N/2 bit inputs to a multiplexer 122. A MATCH_MODE signal operates to select on which of the N/2 bit blocks the matching operation is to be performed. Those skilled in the art will appreciate that the N-bit data bus can be divided into any number of logical subsets (each subset providing an input to a multiplexer or other switching network) on which corresponding matching operation can be performed. The MATCH_MODE signal can be provided from memory (e.g., a CSR—not shown) programmed to select a particular mode of matching to be implemented by the detection system 100.

As one example, the MATCH_MODE signal can correspond to one bit (or more bits depending on the number of bit blocks) of the MODE signal provided to the selection circuitry 108. The MATCH circuit 120 can be activated in more than one mode. For example, a first match mode selects a first set of the N/2 bits and a second match mode selects a second set of the N/2 bits. In this arrangement, the same MODE bit (e.g., the most significant bit or least significant bit) of the MODE signal that selects the match mode can be employed to select a given one of the match modes. Such dual use of the corresponding bit of the MODE signal thus can afford additional efficiencies by reducing the required number of control bits. For example, if the MODE signal is provided as a logic "01", the least significant bit being a "1" can be provided as the MATCH_MODE signal to the multiplexer 122 to connect the corresponding N/2 bits of the N-bit bus to the input of the XNOR circuit 124. Conversely, a "10" MODE signal results in the other N/2 bits of the N-bit bus being provided by the multiplexer 122 to the XNOR circuit 124.

The output (e.g., N/2 bits) of the multiplexer 122 are provided to an exclusive NOR (XNOR) circuit (represented as a single XNOR gate) 124. The XNOR circuit 124 performs bit-wise exclusive-NORing (XNORing) of the selected N/2-bit portion of the of the bus signal output from the multiplexer 122 and an N/2 bit mask (MA_MASK1). The MA_MASK1 can be provided by corresponding memory, such as a CSR (not shown) programmed with a desired pattern and values of bits that defines the match operation. The XNOR circuit 124 provides a corresponding N/2 bit output to an input of an OR circuit (represented as a single OR gate) 126. The OR circuit 126 performs a bitwise OR function on the N/2 bit output from the XNOR circuit 124 with an inverse of an N/2-bit mask (M_MASK2). The M_MASK2 may be provided by associated memory (e.g., a CSR (not shown)). The OR circuit 126 provides a corresponding N/2-bit output to an N/2-bit AND gate 128. The AND gate 128 performs a logical AND function on the N/2 bits to provide a one-bit output (MATCH) signal to second and third inputs of the selection circuitry 108. The MATCH signal thus indicates whether the match condition (defined by the MA_MASK1 signal) was satisfied for a specified bit pattern (defined by MA_MASK_2).

The detection system 100 also can include an AND/OR circuit 130 that can be programmed by an AND/OR_MODE signal (e.g., one bit) to perform either an AND function or an OR function on the N-bits of the N-bit bus. In general, the AND/OR circuit 130 has access to all N bits of the bus 102 stored in the data storage 104. When the AND/OR circuit 130 is operating in AND mode, the circuit asserts its output to an input of the selection circuitry 108 if a selected portion of the N-bits (selected according to the value of an N-bit AO_MASK) are set. When the AND/OR circuit 130 is operating in OR mode, the circuit asserts its output to the selection circuitry 108 if a selected portion of the bits of the N-bits (selected according to the value of the AO_MASK) are set. The AO_MASK signal can be provided by corresponding memory, such as a CSR (not shown), programmed with a desired pattern and values of bits that selects one or more of the N bits to which the activated AND function or OR function will be performed.

In the example of FIG. 2, the AND/OR circuit 130 includes an OR portion 132 and an AND portion 134. The OR portion 132 is configured to perform bit-wise ORing of the AO_MASK with the N-bit output from the data storage 104.

The OR portion 132 includes an AND circuit (represented as a single two-input AND gate) 136 that perform bit-wise ANDing (e.g., performed by N AND gates). The outputs of the AND circuit 136 are input to an N-input OR gate 138 that ORs the N-bit output from the AND circuit 136 to provide an OR output signal (OR_OUT) to one input of a two-input multiplexer 140.

Similarly, the AND portion 134 includes an OR circuit (represented as a single OR gate) 142 that is configured to perform bit-wise ORing of an inverted version of the AO_MASK with the N-bit output from the data storage 104. For instance, the OR circuit 142 can be implemented as N two-input OR gates. The OR circuit 142 provides its N-bit output to corresponding inputs of an N-input AND gate 144. The AND gate 144 performs ANDing of the N-bits from the OR circuit and provides an AND output signal (AND_OUT) to another input of the multiplexer 140.

As mentioned above, the AND/OR_MODE signal controls whether the AND/OR circuit 130 functions in an AND mode, in which case the AND_OUT is output from the multiplexer 140 as resulting input to the selection circuitry 108, or in an OR mode, in which case the OR_OUT is output from the multiplexer 140 to the selection circuitry. Thus, when the AND/OR circuit 130 is operating in the AND mode, the selection circuitry 108 receives the AND_OUT signal from the multiplexer 140, which output will be asserted when all of the bits of the N-bit input that are of interest (as specified by the A/O mask) are set. When the AND/OR circuit 130 is operating in OR mode, the selection circuitry 108 receives the OR_OUT signal from the multiplexer 140, which output will be asserted when any one or more bits of the N-bit input that are of interest (as specified by the A/O mask) are set.

To achieve further efficiency and reduce the required number of control bits, the respective masks, including the CH_MASK and the A/O_MASK individually, as well as the MA_MASK1 and MA_MASK2 in aggregate, can correspond to the same shared block and same bits of memory. The MODE signal can thus be utilized to select the results of which particular function will be output by the selection circuitry 108 so that only the active function will affect the output. Thus, by setting the MODE signal, a particular logic function can be activated so only the activated function provides a corresponding output that is passed through the selection circuitry 108.

Figure 3:
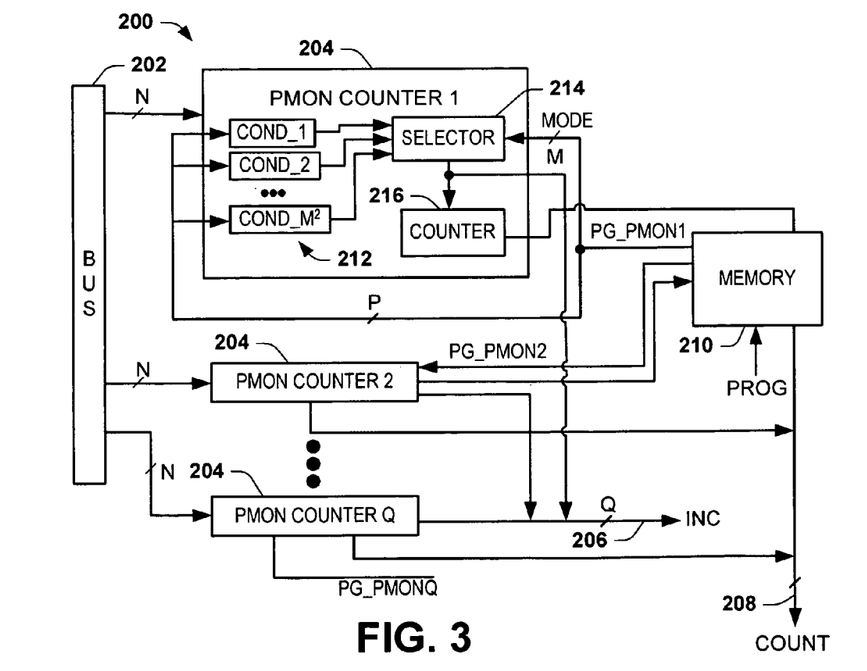
FIG. 3 depicts an example of a performance monitoring system including an embodiment of circuitry for detecting data on a bus.

FIG. 3 depicts an example of a monitoring system 200 that can be utilized to detect performance characteristics associated with data on a bus 202, such as an N-bit observability or debug bus. The monitoring system 200 can be implemented as part of a logic analyzer implemented within a computer system or, alternatively as part of an external general purpose extend logic analyzer. The performance monitoring system 200 includes a plurality of subsystems represented as performance monitor counters (PMON COUNTER 1, PMON COUNTER 2 through PMON COUNTER Q) 204, where Q is a positive integer and Q denotes the number of PMON COUNTERS. The PMON COUNTERS 204 collectively drive an output bus 206 corresponding to a multi-bit output signal, indicated at INC. The INC signal provided at output bus 206 thus can include Q bits of data, one bit from each of the PMON COUNTERS 204. The PMON COUNTERS 204 can also drive an output bus 208 corresponding to a multi-bit output signal indicated at COUNT.

Each of the PMON COUNTERS 204 can be implemented as an arrangement of programmable logic, such as a programmable logic device (PLD), a field programmable gate array, other hardware, or as a combination of hardware and software. Each PMON COUNTER 204 can be programmed to implement an operation or function for a selected portion or subrange of up to the entire N bits that propagate on the bus 202. Examples of the operations and functions are described below with respect to the example of PMON COUNTER 0. The selected portion of the N bits and the particular functionality performed can be programmed for each of the PMON counters 204.

System addressable memory 210 is operatively associated with each of the PMON COUNTERS 204 to program each of the PMON COUNTERS. The system addressable memory 210 can be accessed by a system processor (not shown) as well as by associated diagnostic utilities (not shown) or other devices that are capable of writing to the system addressable memory 210. The data in the system addressable memory 210 programs a particular operation or function that is performed by each of the respective PMON COUNTERS 204. The data in the memory 210 can also set a mode for each of the PMON COUNTERS 204 to control which of a plurality of available operations are activated for driving the output INC bus 206. The general accessibility to the memory is schematically indicated by a PROG signal, which can comprise any number of fields as needed to implement appropriate programming the memory 210 to set operations performed by the performance monitoring system 200.

In the example of FIG. 2, PMON COUNTER 1 is depicted as including a plurality of condition blocks 212, depicted as COND_1, COND_2 through COND_M, where M is a positive integer greater than or equal to 2 denoting the number of condition detection circuits. By way of example, COND_1 can implement a change detection function to detect a change in a selected portion of one or more bits of the N-bit signal on the bus 202. COND_2 can implement a matching function relative to one or more selected bits of data (e.g., up to all data) from the bus 202. The other one or more condition blocks can be configured to implement other operations on the N-bit signal on the bus, including, for example, logic functions (e.g., AND, OR, XOR, NOR, AND, XNOR and combinations of functions), arithmetic functions (e.g., addition, subtraction, multiplication, division, etc.), as well as various combinations of logic and arithmetic functions on one or more bits on the bus 202.

PMON COUNTER 1 also includes a selector 214 that is coupled to receive outputs from each of the condition blocks 212. The selector 214 selects one of the outputs from the condition blocks 212 and provides such output to the output bus 206 based on a MODE signal. The MODE signal thus controls which of the plurality of condition blocks is coupled to drive the output bus based on the condition implemented on the N-bit signal on the bus 202. The MODE signal may be provided by the memory 210, for example, corresponding to two or more control bits.

PMON COUNTER 1 also includes a counter 216 that can track a count value based on the selector output. For example, the counter 216 can provide a signal having a value indicative of the number of times a selected performance condition implemented by the active condition block 212 is met, such as during a given capture session or over a plurality of sessions. The counter 216 can be reset, as needed, such as when switching between different conditions 212. Those skilled in the art will appreciate that the duration of count, resetting of the counter 216 and other related counting functions can be controlled during operation by control bits, such as based on data programmed in the memory 210. The output of the counter 216 can be provided to the output COUNT bus 208. The output COUNT bus 208, thus, can include an indication of count values from each of the PMON COUNTERS 204.

As mentioned above, the particular operations performed by the condition blocks 212 in PMON COUNTER 1 can be programmed according to a PG_PMON1 signal from the system addressable memory 210. The PG_PMON1 signal, for example, can include a P-bit signal, where P is a positive integer that includes up to about N bits of masking data that can establish on which data from the bus 202 each performance condition is to be implemented. For instance, a portion of the P bits of the PG_PMON1 signal can specify a set of one or more bits of interest to which the condition is to be applied. Additionally, the P bits of the PG_PMON1 signal can include mode bits to control internal operating modes of the respective condition blocks 212. Another part of the PG_PMON1 signal can include a multi-bit MODE signal that is provided to the selector (e.g., a multiplexer) 214 of PERFORMANCE COUNTER 1 for selecting which output from the condition blocks 212 is provided to the output bus 206 and to the counter 216. As described herein, a common address range in the memory 210 can be employed to store the N-bit mask that is shared by the condition blocks. Additionally, the MODE signal (or at least a portion thereof) can also be used to control the mode of one or more of the condition blocks when such block itself is capable of implementing plural operating modes (e.g., an AND/OR function block or a matching function).

For purposes of simplicity of explanation, the internal contents of the other PMON COUNTER 2 through PMON COUNTER Q have been omitted from FIG. 3, although it will be understood that each can be similarly configured as shown and described with respect to PMON COUNTER 1 . That is, each PMON COUNTER 204 can be programmed and/or configured to perform a selected performance condition(s) that drives the INC bus 206. For instance, each of the other PMON COUNTERS 204 can receive a similar respective program signal (e.g., PG_PMON2 and PG_PMONQ) from the memory 210. The respective INC signals can be employed, for example, to trigger logic analysis and/or to qualify storage of data from the bus 202. The respective count values provided by the PMON COUNTERS 204 can also be evaluated as part of logic analysis or for performing other related functions (e.g., diagnostic utilities). While the PMON COUNTERS 204 have been described as being programmable, it is also contemplated that one or more of the PMON COUNTERS 204 can be hardwired to implement fixed performance monitoring conditions (e.g., change detection, matching, and the like).

Figure 4:
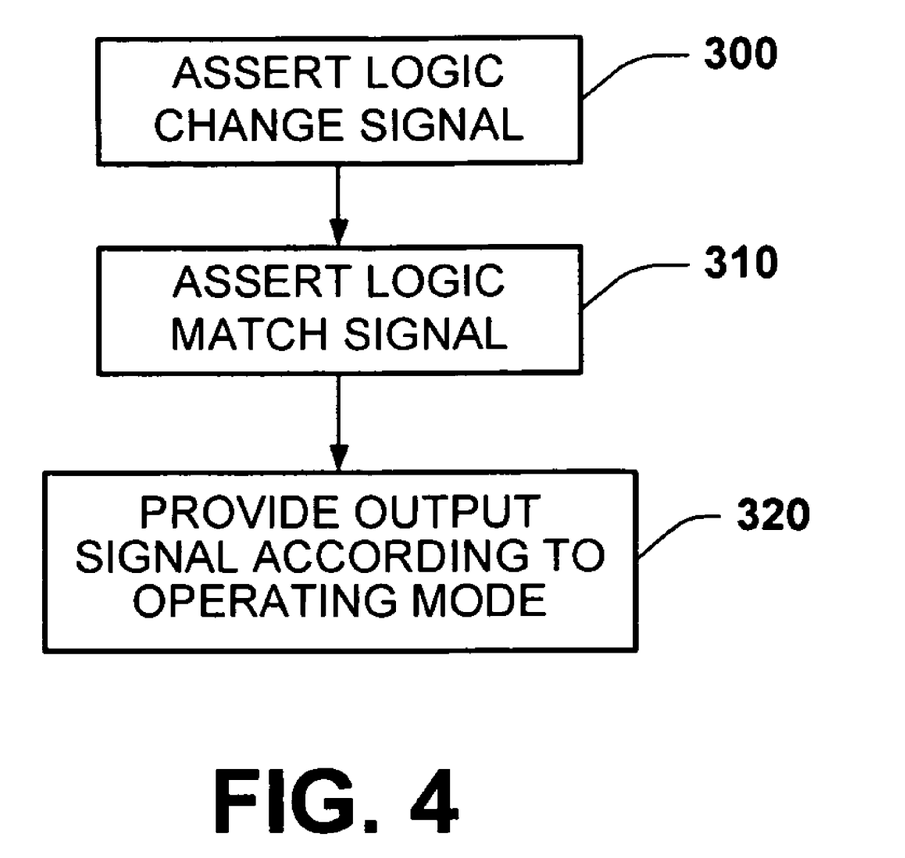
FIG. 4 is a flow diagram depicting one embodiment of a method for detecting a condition of data.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all features illustrated in FIG. 4 may be required to implement a method. It is to be further understood that the following methodology can be implemented in hardware (e.g., instantiated on an IC chip, a computer or a diagnostic tool), software (e.g., stored in a computer readable medium or as executable instructions running on one or more processors), or as a combination of hardware and software.

FIG. 4 is a flow diagram illustrating a method for analyzing data propagating on an N-bit bus. At 300, the method includes asserting a logic change signal if a first predetermined portion of the data changes. This predetermined portion of the data can be selected by programming change mask data to define which bits of the data (e.g., a specified bit pattern) are of interest, such as described herein.

At 310, the method includes asserting a logic match signal if a second predetermined portion of the data includes a specified bit pattern. The specified bit pattern can be selected by programming match mask data, which can be a portion of the N bits (e.g., N/2 bits). The match mask data thus defines which bits of the data a corresponding match function will be applied, such as described herein. The change mask data and the match mask data can be the same, such as to afford efficiencies by reducing the amount of memory or register space needed to perform the method in hardware. At 320, an output signal is provided that includes one of the logic change signal and the logic match signal according to an operating mode. The operating mode can be set based on a mode control signal, the output signal corresponding to one of the logic change signal or the logic match signal selected based on the mode control signal. Some of the mode control signals can also be utilized by condition monitoring circuitry to further reduce the number of control bits utilized in performing the method.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. In the claims, unless otherwise indicated, the article "a" is to refer to "one or more than one".

What is claimed is:

1. A condition detection system comprising:
   change circuitry configured to detect a change in at least one predetermined bit of an N-bit bus, where N is a positive integer, and to provide a corresponding change signal indicative of the detected condition;
   match circuitry configured to detect a match condition for up to a selected subset of predetermined bits of the N-bit bus and to provide a corresponding match signal indicative of the detected condition; and
   selection circuitry programmable to provide a selected one of the change signal and the match signal as a corresponding output signal.

2. The system of claim 1, further comprising a counter configured to adjust a count value based on the corresponding output signal.

3. The system of claim 1, further comprising a logic analyzer configured to at least one of (i) qualify storage of data on the N-bit bus and (ii) trigger logic analysis of data on the N-bit bus in response to the corresponding output signal.

4. The system of claim 1, further comprising at least one other detection circuit configured to detect a condition of at least one bit on the N-bit bus other than the change and the match condition and provide a corresponding detector signal indicative thereof the detected condition, the selection circuitry being programmable to provide the corresponding output signal by selecting one of the change signal, the match signal and the detector signal.

5. The system of claim 1, further comprising a data storage device configured to store a logic signal indicative of the whether the change circuitry detected the change in the at least one predetermined bit of the N-bit bus, the data storage device providing the change signal to an input of the selection circuitry.

6. The system of claim 1, wherein the match logic circuitry further comprises a match mode selector configured to select a subset of the N-bit bus to which the match condition is applied.

7. The system of claim 1, wherein the change circuitry further comprises an input for receiving change mask data to program the at least one predetermined bit of the N-bit bus.

8. The system of claim 7, further comprising data storage that stores N-bits of data from the N-bit bus corresponding to a previous state of the N-bits of data, the change logic circuitry configured to detect the change in the at least one predetermined bit of the N-bit bus as a function of the stored N-bit of data and a present N-bits of data from the N-bit bus.

9. The system of claim 1, wherein the match logic circuitry further comprises an input for receiving match mask data to program the match condition for up to a selected N/2 predetermined bits of the N-bit bus.

10. The system of claim 9, wherein the change logic circuitry further comprises an input for receiving change mask data to program the at least one predetermined bit of the N-bit bus.

11. The system of claim 10, wherein at least a substantial portion of bits in the change mask data and the match mask data are the same.

12. Circuitry for analyzing multi-bit data that propagates over a bus, comprising:
    means for performing a plurality of detection functions, each of the plurality of detection functions being operative to detect a respective condition of a selected portion of the multi-bit data and for providing a corresponding logic signal indicative of whether the respective condition has been met, the plurality of detection functions comprising:
       at least means for detecting a change in the multi-bit data; and,
       means for detecting a match condition in at least a selected portion of the multi-bit data; and
    means for selecting the corresponding logic signal and for providing the selected signal as an output signal based on a mode control signal.

13. The circuitry of claim 12, further comprising:
    means for qualifying storage of data on the N-bit bus based on the output signal; and
    means for triggering logic analysis of data on the N-bit bus based on the output signal.

14. The circuitry of claim 12, wherein the plurality of detection functions further comprises means for performing at least one of a bit-wise AND function and a bit-wise OR function for at least one bit on the N-bit bus and for providing a corresponding AND/OR logic signal.

15. The circuitry of claim 12, wherein the means for performing a plurality of detection functions further comprises means for programming mask data to set the selected portion of the multi-bit data.

16. The circuitry of claim 15, wherein at least a substantial portion of the mask data is shared by at least some of the plurality of detection functions.

17. A method for analyzing data propagating on an N-bit bus, where N is a positive integer, the method comprising:
    asserting a logic change signal if a predetermined portion of the data changes;
    asserting a logic match signal if a predetermined portion of the data includes a specified bit pattern;
    providing an output signal that includes one of the logic change signal and the logic match signal according to an operating mode.

18. The method of claim 17 further comprising:
    programming change mask data to define a first predetermined portion of the data, the logic change signal being asserted if the first predetermined portion of the data changes; and programming match mask data to define a second predetermined portion of the data, the logic match signal being asserted if the second predetermined portion of the data includes the specified bit pattern.

19. The method of claim 18, wherein the change mask data and the match mask data are the same.

20. The method of claim 19, further comprising setting the operating mode based on a mode control signal, the output signal corresponding to one of the logic change signal or the logic match signal as selected based on the mode control signal.

* * * * *

UNITED STATES PATENT AND TRADEMARK OFFICE
CERTIFICATE OF CORRECTION

| | | |
|---|---|---|
| PATENT NO. | : 7,774,652 B2 | Page 1 of 1 |
| APPLICATION NO. | : 11/523472 | |
| DATED | : August 10, 2010 | |
| INVENTOR(S) | : Richard Adkisson et al. | |

It is certified that error appears in the above-identified patent and that said Letters Patent is hereby corrected as shown below:

In column 10, line 31, in Claim 12, delete "and ," and insert -- and --, therefor.

Signed and Sealed this
Fifteenth Day of March, 2011

David J. Kappos
*Director of the United States Patent and Trademark Office*